Sept. 14, 1937.  J. K. MAKI  2,093,089
SPRING DEVICE
Filed Feb. 20, 1936
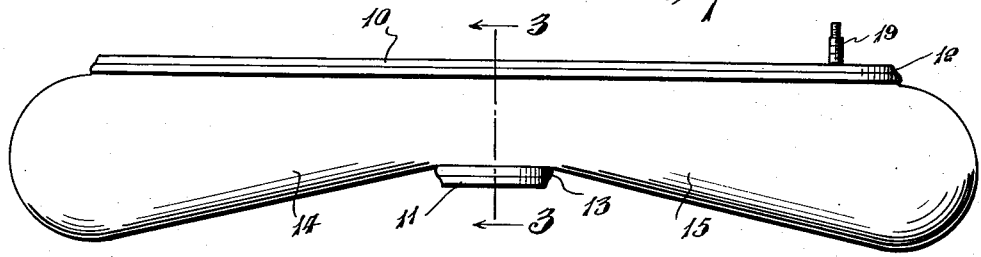
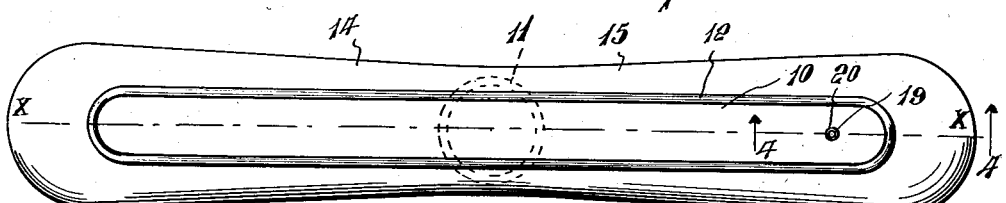
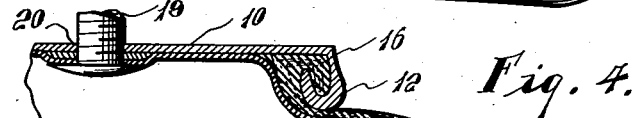
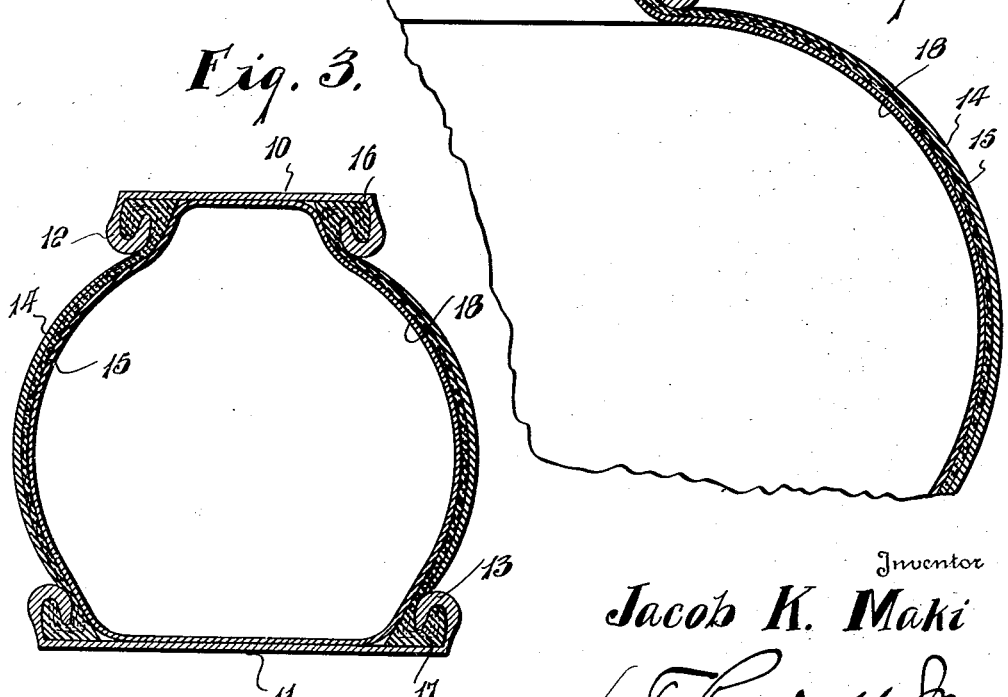
Inventor
Jacob K. Maki
Attorney Patented Sept. 14, 1937

2,093,089

UNITED STATES PATENT OFFICE 2,093,089

SPRING DEVICE

Jacob K. Maki, White Valley, Mass.

Application February 20, 1936, Serial No. 64,963

3 Claims. (Cl. 267—35)

This invention relates to a spring device and it primarily aims to provide a practical and efficient substitute for metallic springs, especially but not necessarily, those used to absorb the shock imparted to the wheels of vehicles, especially automobiles, buses, trucks or the like.

It is further aimed to provide an efficient device of the present character operating on the principle that a change in volume of gas will cause a change in pressure.

It is further aimed to provide a structure which will require no lubrication, will be noiseless and cannot rattle, will not break by subjection to severe shock, is easily adjustable for varying blows and will prevent sudden downward motion of wheels, axles or the like caused by loss of upward force on the wheel.

The more specific objects and advantages will become apparent from a consideration of the description following taken in connection with accompanying drawing illustrating an operative embodiment.

In said drawing:—

Figure 1 is a view in side elevation of the improved spring device;

Figure 2 is a plan view of said improved spring device;

Figure 3 is a vertical sectional view taken on the line 3—3 of Figure 1; and

Figure 4 is an enlarged fragmentary cross sectional view on a plan taken through the inflation valve.

Referring specifically to the drawing wherein like reference characters designate like or similar parts, the device has a receiver plate at 10 and a shock plate at 11, respectively adapted to be attached to the chassis of a vehicle and to an axle thereof, or correspondingly to any parts between which a shock is to be absorbed, whether in an automobile or vehicle or in any other relation where shock is to be absorbed. Such plates are preferably metallic. Plate 10 is shown as elongated and marginally has a depending male clincher flange at 12. The plate 11 is preferably round and it has a marginal, male clincher flange 13.

Removably disposed between the plates 10 and 11 is a shoe or casing 14 which is continuous and open at top and bottom. This casing is made of any suitable flexible material which is inelastic or but slightly elastic externally and is rendered water and weather proof, as for instance by a rubber coating at 15. The main wall of the casing 14 may be of canvas or constructed of material similar to the outercasing or shoe of automobile tires. Such casing 14 at the upper edge has a continuous female clincher flange at 16 which is engaged by the clincher flange 12. At the lower edge of the casing 14, there is a female clincher flange 17 which is engaged by the clincher flange 13.

Disposed between the plates 10 and 11 and within the casing is a bladder 18, preferably removable, whose wall is made of elastic rubber, such bladder having an inflation valve structure 19 passing removably through an opening 20 in the plate 10.

It will be realized that when tube 18 is inflated through the valve 19, the parts connected to the plates 10 and 11 will be connected in a manner where shocks are absorbed. It will also be realized that they are separably connected to the casing by means of the clincher flanges and that the bladder is removably disposed within the structure.

The spring operates on the principle that a change in volume of any gas will cause a change in pressure. The change in pressure is indirectly proportional to the change in volume, $$\frac{P_1}{P_2} = \frac{V_2}{V_1}$$

Also the pressure of a gas is equal in all directions.

According to the above principle if the change in volume is small in proportion to the total volume the change in pressure will also be small. It is therefore desirable to have a large container as compared to the volume displaced by the shock plate of this machine when it is caused to move upward in order that the least amount of resistance will be caused but sufficient to return the shock plate to its normal position.

The natural shape of a flexible container under sufficient internal pressure is round. In this machine this is taken advantage of by having internal pressures great enough that the shape of the container will be substantially round or circular about the axis $x$—$x$ in Fig. 2. This will thus prevent any downward motion of the shock plate from its normal or neutral position. The area of the shock plate must be such that the pressure within the casing multiplied by the area of the shock plate will be just enough to support the weight caused by load on the receiver plate.

Various changes may be resorted to provided they fall within the spirit and scope of the invention.

I claim as my invention:—

1. A spring device of the class described having a receiver plate and a shock plate, and a pneumatic structure substantially circular about its longitudinal axis carrying said plates on opposite sides thereof, said receiver plate being elongated and the other plate being substantially round, said pneumatic structure at its lower surface diverging downwardly away from the shock plate.

2. A spring device of the class described having a receiver plate and a shock plate, and a pneumatic structure substantially circular about its longitudinal axis carrying said plates on opposite sides thereof, said receiver plate being elongated and the other plate being substantially round, said pneumatic structure at its lower surface diverging downwardly away from the shock plate, and inter-engaging flanges between the plates and said pneumatic structure.

3. A spring device of the class described having a receiver plate and a shock plate, and a pneumatic structure substantially circular about its longitudinal axis carrying said plates on opposite sides thereof, said receiver plate being elongated and the other plate being substantially round, said pneumatic structure at its lower surface diverging downwardly away from the shock plate, inter-engaging flanges between the plates and said pneumatic structure, said pneumatic structure being a flexible casing, a pneumatic bladder within said casing, and an inflation valve for said bladder extending through one of said plates.

JACOB K. MAKI.